United States Patent [19]

Baumgartner

[11] Patent Number: 5,738,204
[45] Date of Patent: Apr. 14, 1998

[54] CONVEYOR MEANS AND USE THEREOF

[75] Inventor: Michael Baumgartner, Rekingen, Switzerland

[73] Assignee: Elpatronic AG, Zug, Switzerland

[21] Appl. No.: 607,706

[22] Filed: Feb. 27, 1996

[30]  Foreign Application Priority Data

Mar. 20, 1995 [CH] Switzerland ............... 587/95

[51] Int. Cl.$^6$ ............................................. B56G 19/26
[52] U.S. Cl. ............................................. 198/732
[58] Field of Search ............................... 198/732

[56]  References Cited

U.S. PATENT DOCUMENTS 2,443,010  6/1948  Petskeyes et al. .................. 198/175
2,570,030  10/1951  Forster .............................. 198/170
3,627,106  12/1971  Winfield ............................ 198/732
4,697,693  10/1987  Rajala et al. ...................... 198/699
5,000,306  3/1991  Zitz et al. ......................... 198/732

FOREIGN PATENT DOCUMENTS 49 22 243 A  6/1974  Japan .
2270291  3/1994  United Kingdom .

*Primary Examiner*—Joseph E. Valenza
*Attorney, Agent, or Firm*—McCormick, Paulding & Huber

[57]  ABSTRACT

A two-point attachment of the pusher on the toothed belt of a conveyor means in conjunction with a rocking lever causes the pusher to perform a rocking motion in the direction opposite to the conveying direction upon deflection of the toothed belt around a return wheel. This results in reduced vibration of the conveyor means and reduced risk of damage to the item conveyed before the pusher dips below the conveying plane (F).

4 Claims, 4 Drawing Sheets

CONVEYOR MEANS AND USE THEREOF

BACKGROUND OF THE INVENTION

The invention relates to a conveyor means with a conveyor element following a non-rectilinear path, in particular for a reversal of movement, and with at least one pusher arranged thereon to act upon an item to be conveyed. The invention also relates to the use of the conveyor means.

A conveyor means of the said kind is known eg. from the document U.S. Pat. No. 4,697,693, and is illustrated in FIG. 1. As conveyor element, it has a toothed belt 2 which is twice deflected by toothed wheels 3 to the reverse direction. Pushers 4, only one of which is shown, are attached to the toothed belt. Various arrangements of such conveyor means are known, eg. arrangements having several deflections, or having a circulating chain as conveyor element. With these known conveyor means, a high angular momentum is created in the region of the reversal of the chain or toothed belt. This may cause both severe vibration of the conveyor means, and also damage to the article conveyed owing to the rotary motion of the pusher. The latter may make it necessary for the conveyor means to be driven at non-uniform speed, so that a deceleration occurs before deflection of the pusher concerned, in order that the article can be removed from the conveyor means before the pusher is able to inflict damage.

SUMMARY OF THE INVENTION

In one aspect the invention provides conveyor means which can be so arranged that these disadvantages can be avoided.

In accordance with the present invention in a conveyor means of the above-mentioned kind, there is imparted to the pusher, in the region of reversal of the conveyor element, a motion which is superimposed on the deflecting motion.

In principle this enables the stated aim to be achieved, particularly if the superimposed motion of the pusher is made to act in the opposite direction to the conveying direction. There results a reduction in vibration, and at the point of deflection the pusher is able to move out of the path of the item to be conveyed without executing a pivoting motion which might cause the item to be damaged. This makes it possible to use an essentially constant speed drive. A preferred use of the conveyor means is to feed can bodies to a welding machine to weld the longitudinal seam. However, the conveyor means according to the invention may be used for any other suitable conveying applications.

BRIEF DESCRIPTION OF THE DRAWINGS

Embodiments will now be described in detail, by way of example, with reference to the accompanying figures, in which.

DESCRIPTION OF THE PREFERRED EMBODIMENTS

Figure 1:
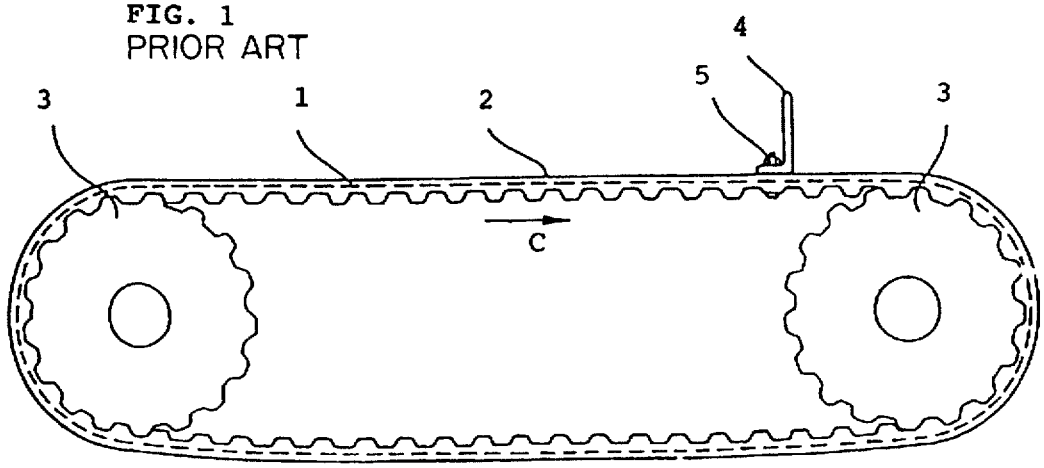
FIG. 1 shows a conveyor means according to the state of the art.

FIG. 1 shows conveyor means according to the state of the art, with a pusher 4 essentially rigidly fixed to toothed belt 2.

Figure 2:
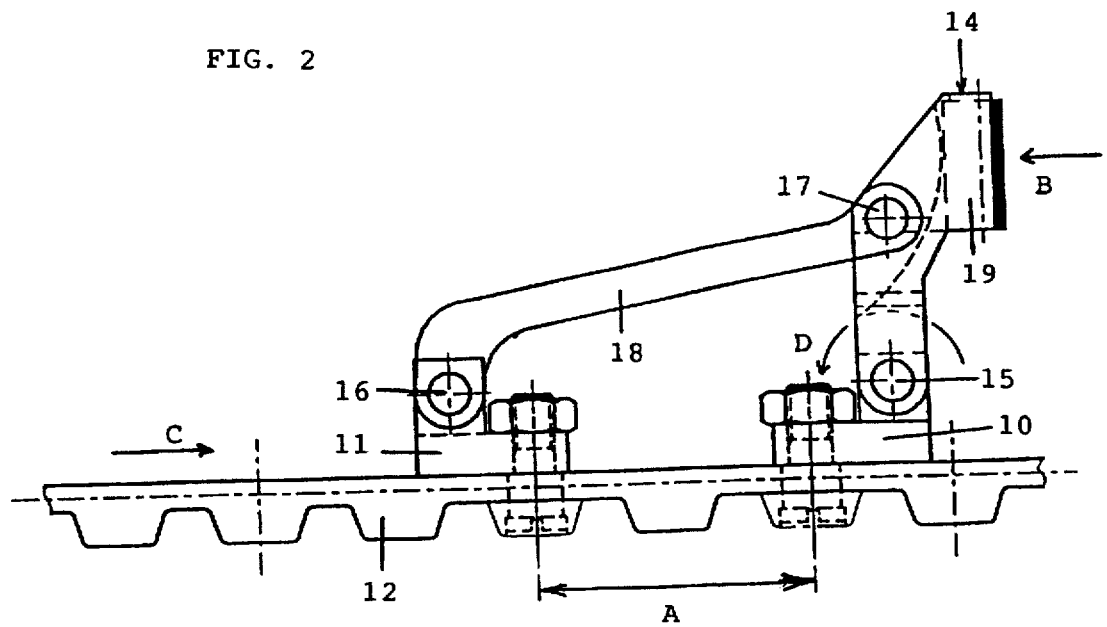
FIG. 2 shows an embodiment of a pusher on a conveyor means according to the invention.

FIG. 2 shows an embodiment according to the invention. A first foot 10 of pusher 14 is attached to toothed belt 12. The pusher body 19 is mounted on the foot 10 so as to be pivotable about a first pivot axis 15. When the toothed belt is travelling in a straight line the pusher body 19 is essentially rigidly mounted on the toothed belt and a force B is unable to tilt it, as the pusher body is attached to the toothed belt 12 by a second foot 11 (at a distance A from the first foot) through a rocking lever 18 mounted on the pusher body by means of a pivot 17. The lever 18 is also hinged to the foot 11 on a pivot axis 16.

When an item is conveyed along the straight portion of the toothed belt 12, the pusher 14 behaves in the same way as the pusher according to the state of the art.

Figure 3:
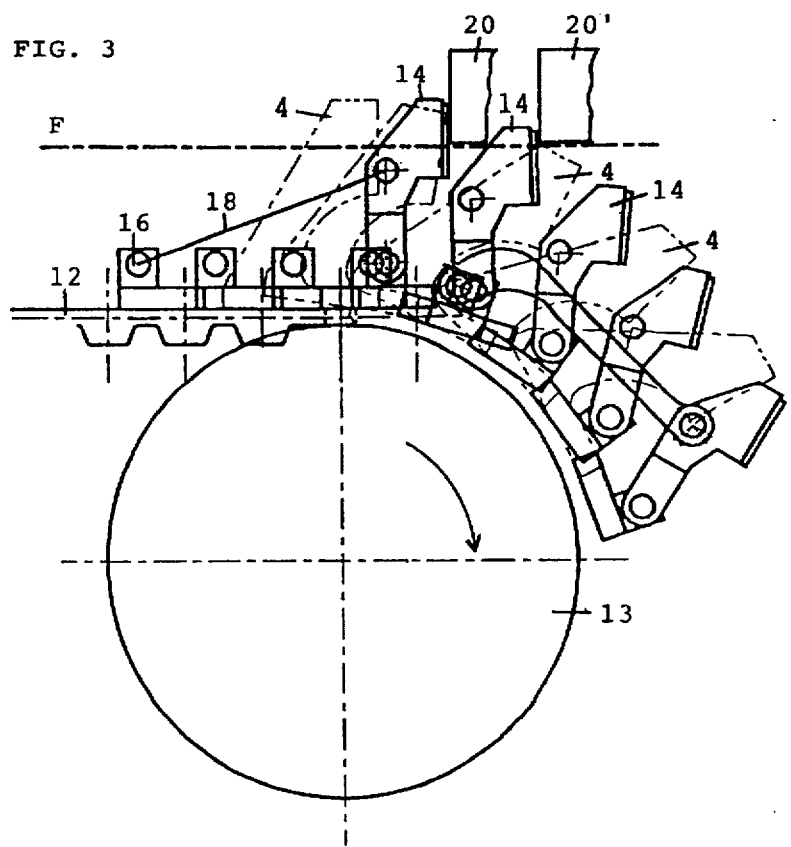
FIG. 3 shows various states of movement of the pusher according to FIG. 2 in the course of deflection.

However, upon deflection of the toothed belt 12 from the straight path, there is a tilting back in the direction of the arrow D, as the deflection should cause the distance between the pivot axes 16 and 17 to increase, but this is prevented by the lever 18, causing the pusher body 19 to tilt about the axis 15 in the opposite direction to the conveying direction. FIG. 3 shows five successive positions of the pusher 14 as the toothed belt 12 is deflected around return wheel 13. For comparison with the state of the art, a conventional pusher 4, drawn in broken lines, is also shown. It can clearly be seen how the tilting action of the pusher 14 brought about by the lever 18 in the opposite direction to the deflection causes the pusher 14 to dip below the conveying plane F before it begins to pivot, so that no pivoting motion of the pusher is imparted to the article conveyed (which is indicated in positions 20 and 20'), thus reliably preventing damage to the article (eg. a can body of sheet metal) such as could be caused by a pusher swinging into it. This means that it is no longer necessary for the drive to the conveyor means to be non-uniform, and a constant speed drive can be used.

The rotary motion illustrated also results in considerably less vibration of the conveyor means, which moreover allows the running speed to be increased, or the conveying frequency to be speeded up. For a given running speed, the reduced vibration results in less stress being imposed on the conveyor means. The two-point attachment of the pusher 14 also results in reduced stress on the belt or chain.

Figure 4:
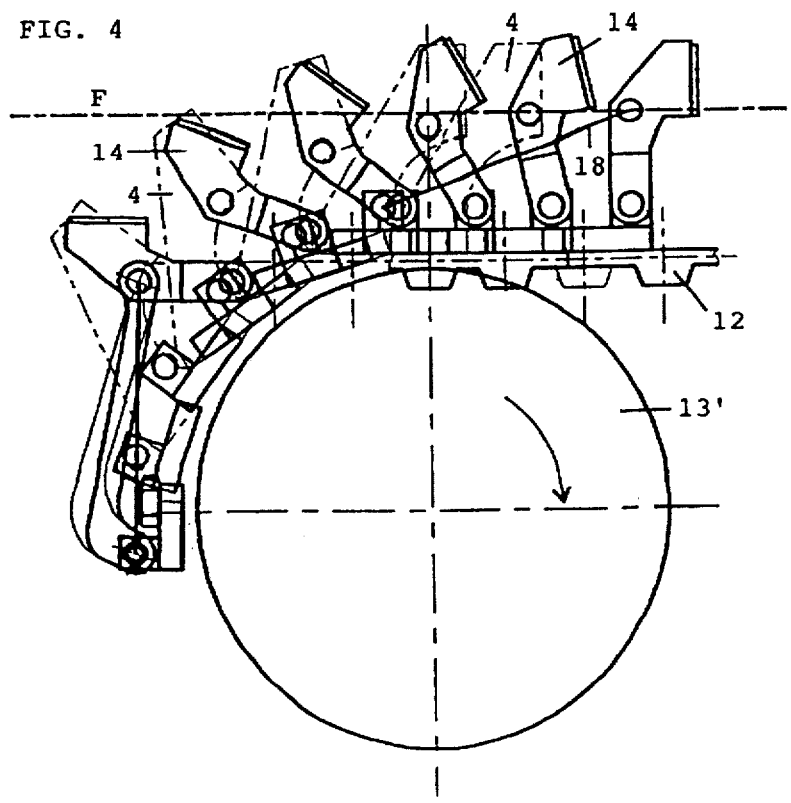
FIG. 4 shows various movement steps in the course of the second deflection of the pusher.

FIG. 4 shows various positions of the pusher 14 as it approaches the conveying plane F, having passed around the second return wheel 13' at the opposite end of the conveyor.

Figure 5:
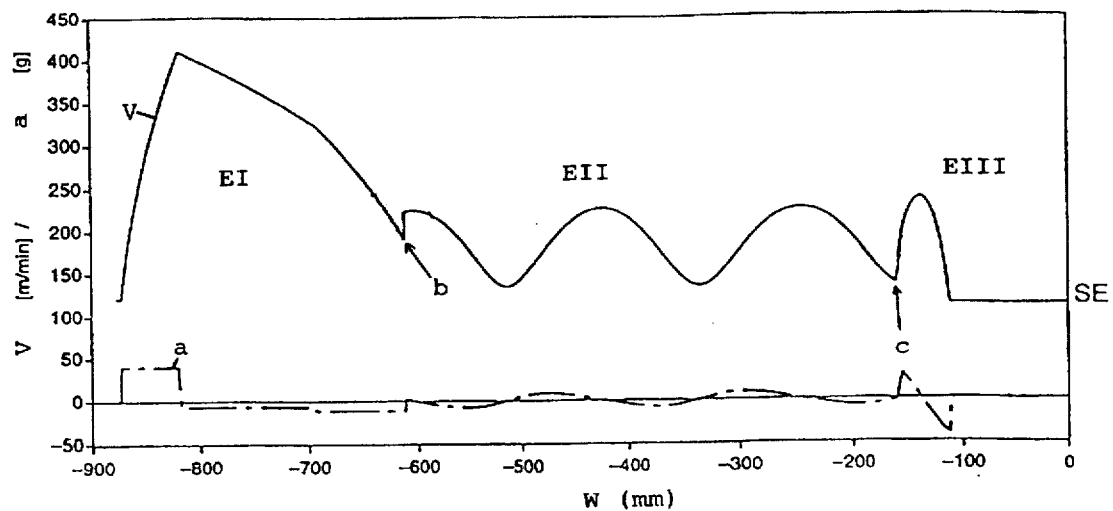
FIG. 5 is a graph of velocity and acceleration over the path, for a conveyor means according to the state of the art.

FIG. 5 is a diagram showing the velocity V and acceleration of a 110 mm high can body in three successive conveyor means of a can welding machine over the conveying path W. EI is a first known insertion device in the region of the rounding unit, and EIII is a known insertion device in the region of the calibrating tool. These insertion devices will not be considered in detail here. EII denotes a conveyor means with rigid pushers as described above as state of the art. Transfer from EI to EII, and from EII to EIII, takes place at points b and c, respectively, in the diagram. It can be seen that the can body travels at varying speed in the EII sector owing to the programmed drive of the conveyor means EII according to the state of the art, as the velocity has to be lower at the transfer point c. SE denotes the welding plane.

Figure 6:
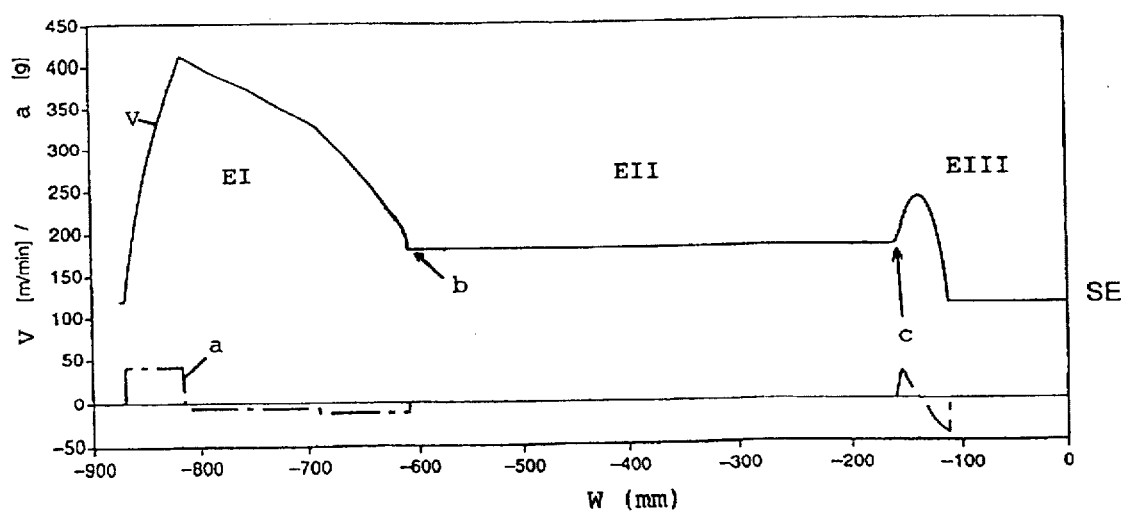
FIG. 6 is a graph of velocity and acceleration over the path, for a conveyor means according to the invention.

By contrast, FIG. 6 shows the behaviour of the embodiment according to the invention. The uniform velocity, or smaller variation in acceleration, in the sector EII which is now possible can be clearly seen. This results in a simpler drive for the conveyor means.

Figure 7:
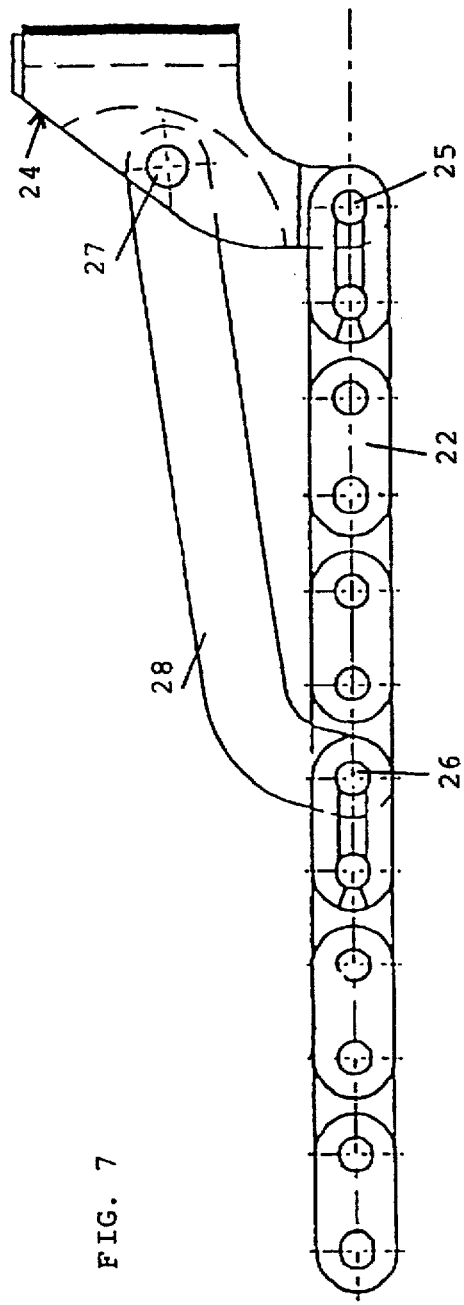
FIGS. 7 and 8 show a side view and a top plan view respectively of a further embodiment of the conveyor means according to the invention.
Figure 8:
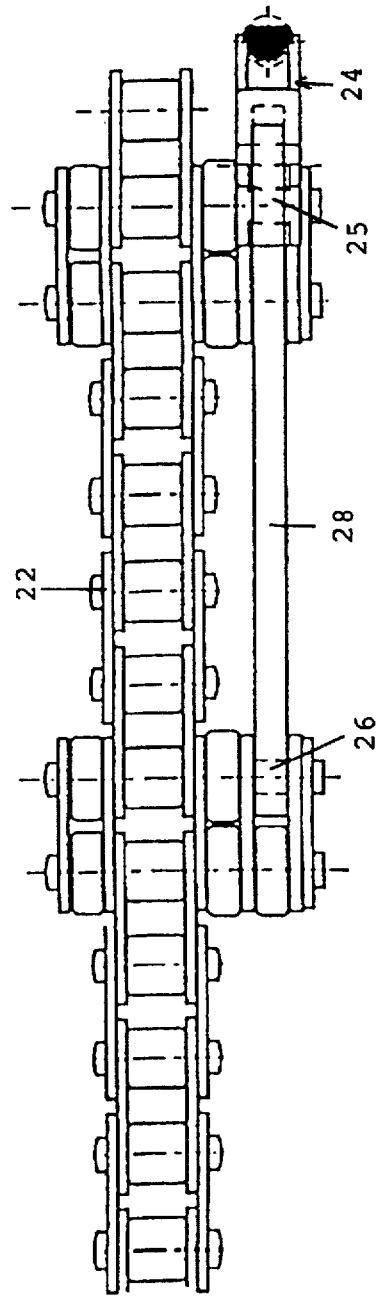

FIGS. 7 and 8 show an embodiment with a chain as the conveyor element, with components similar to those of the previous example designated by the same reference numbers plus 10.

A different motion results if the rocking lever 18 or 28 is made to lead in the direction of the belt or chain travel, so that eg. the foot 11 in the example in FIG. 2 would be attached in front of the foot 10. The superimposed tilting motion of the pusher 14 would then occur in the opposite direction to that shown. Although this would mean that the advantages which have been described of low vibration and of parallel dipping of the pusher would not be obtained, applications may exist in which the faster and earlier dipping of the pusher, compared with the pusher according to the state of the art, which can be achieved in an arrangement in which the lever 18,28 is leading might be considered an advantage.

Advantages ensue especially when the conveyor means according to the invention is used for conveying can bodies to a can body welding machine, namely, reduced retardation of cans, and reduced wear in the Z-rail and guide dies.

I claim:

1. A conveyor comprising:

a toothed belt for movement along a non-rectilinear path;

at least one pusher coupled to the toothed belt for acting upon an item to be conveyed, the at least one pusher including:

a first pusher foot fixedly mounted on an outer flat side of the belt at a first location;

a second pusher foot fixedly mounted on the outer flat side of the belt at a second location;

a pusher body pivotally mounted about a first pivot axis arranged on the first pusher foot; and a rocking lever pivotally coupled at one end to the second pusher foot and pivotable about a second pivot axis arranged on the second pusher foot, and the rocking lever pivotally coupled at another end to the pusher body and pivotable about a third pivot axis on the pusher body located in spaced relation from the first pivot axis in such a way as to impact to the pusher body in the region of deflection of the belt from a straight path a motion which is superimposed on the deflection motion.

2. A conveyor according to claim 1, wherein the second pusher foot is positioned behind the first pusher foot relative to the conveying direction so that the superimposed motion of the pusher upon deflection of a conveyor element from a straight path to a curved path is in the direction opposite to the conveying direction.

3. A conveyor according to claim 1, further including an essentially constant speed drive connected in driving relationship with the toothed belt.

4. A conveyor for feeding can bodies in a roller seam welding machine for seam welding can bodies, the conveyor comprising:

a toothed belt movable along a non-rectilinear feed path for the can bodies; and a pusher connected with the toothed belt for movement with the belt in the non-rectilinear path and engagement with the can bodies along a portion of the feed path, the pusher including:

a first pusher foot fixedly mounted on an outer flat surface of the toothed belt at a first location;

a second pusher foot fixedly mounted on said outer flat surface of the toothed belt at a second location spaced along the path from the first location;

a pusher body pivotally mounted to the first pusher foot and engageable with the can bodies; and a rocking lever having one end pivotally connected to the second pusher foot and an opposite end pivotally connected to the pusher body so as to pivot the body relative to the first pusher foot when the belt is deflected in the non-rectilinear feed path.

* * * * *